Nov. 13, 1934.　　D. A. BARNETT　　1,980,656
TRANSMISSION SYSTEM
Filed July 20, 1932　　2 Sheets-Sheet 1
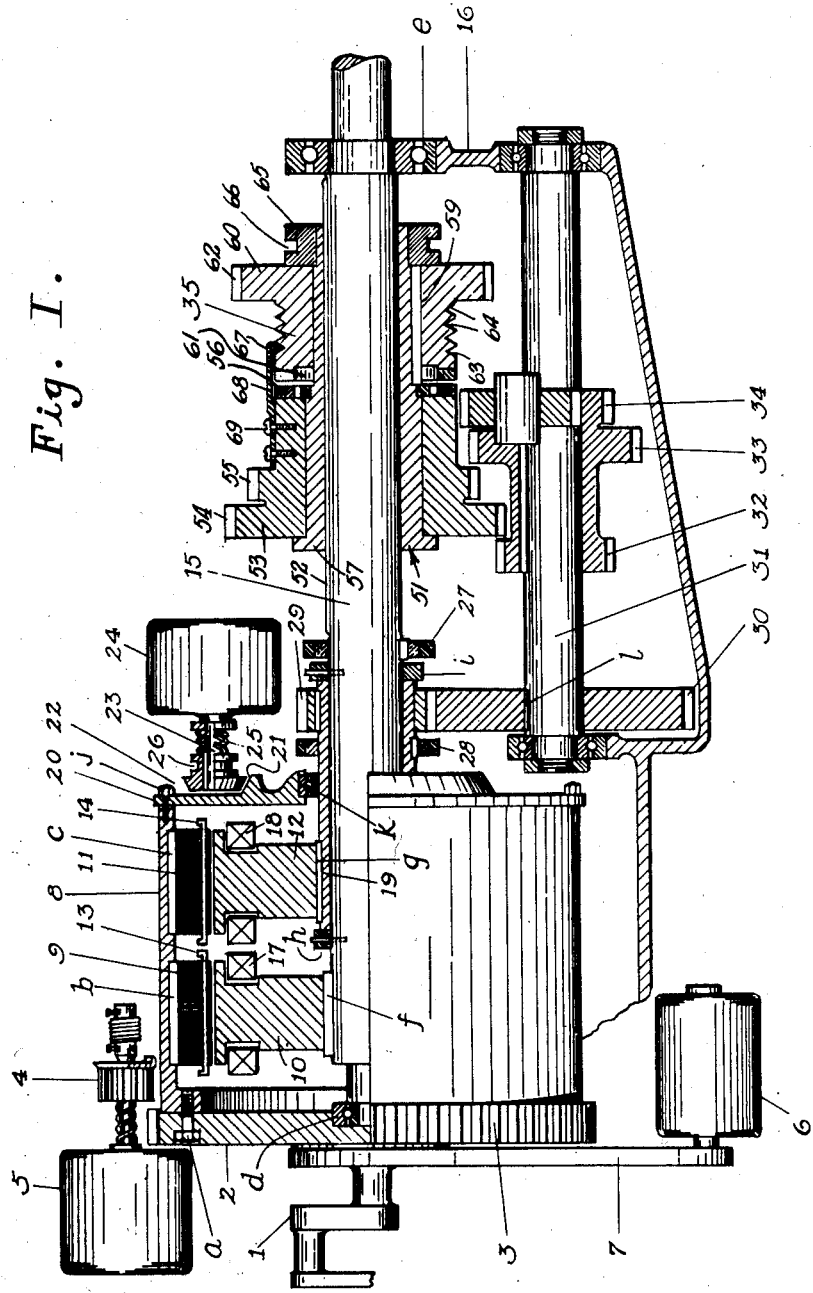
INVENTOR.
David A. Barnett.
BY Roderick Malcolm.
ATTORNEY.

Nov. 13, 1934.        D. A. BARNETT        1,980,656
TRANSMISSION SYSTEM
Filed July 20, 1932        2 Sheets-Sheet 2
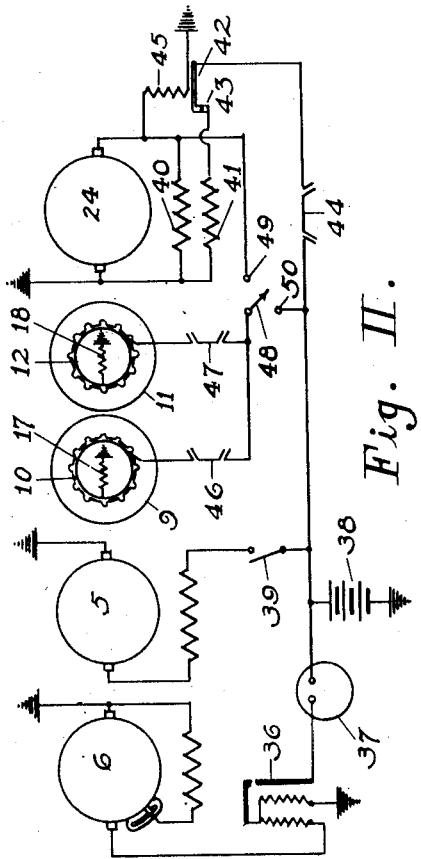
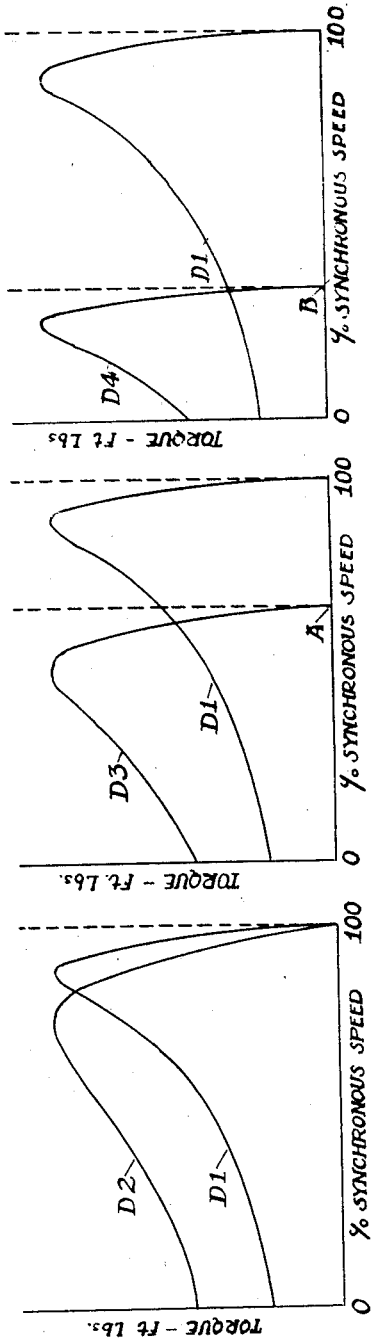
INVENTOR.
David A. Barnett.
BY Roderick Malcolm
ATTORNEY.

Patented Nov. 13, 1934

1,980,656

UNITED STATES PATENT OFFICE 1,980,656

TRANSMISSION SYSTEM

David A. Barnett, Hamden, Conn.

Application July 20, 1932, Serial No. 623,523

8 Claims. (Cl. 172—284)

My present invention relates to improvements in power transmission apparatus, particularly to apparatus adapted for use in automotive devices, and has special reference to the provision of means whereby a transfer of power is accomplished by means of a dual electro-magnetic unit and without the interposition of a friction clutch or other rigid connection between prime mover and driven shaft.

In the transmission system described in United States Patent No. 1,794,613 to John Allen Heany, issued March 3, 1931, a rigidly coupled mechanical gear reduction mechanism and an induction unit are connected in parallel between the prime mover and driven shaft. The arrangement is such that the gear reduction mechanism tends to drive the propeller shaft at a speed greatly reduced from that of the prime mover while the induction unit tends to drive the propeller shaft at approximately engine speed, so that when the torque of the induction unit is great enough the load is taken up directly by the induction unit, the propeller shaft being permitted to turn faster than the reduction gear by means of an overrunning clutch associated therewith. The mechanical gear reduction mechanism, when engaged, provides a rigid coupling between prime mover and driven shaft.

An object of my invention is to provide an apparatus for transmitting power wherein there is no rigid coupling between prime mover and driven shaft, and whereby starting and acceleration are effected without undesirable abruptness.

Another object of my invention is to provide a new and improved apparatus for automotive devices wherein acceleration of the device from standstill to full speed shall be continuously variable instead of by step-by-step progression, as in prior art arrangements utilizing a mechanical gear shift.

Another object of my invention is to provide a power transmitting apparatus whereby acceleration from standstill is made practical over a wide range of conditions and without any manual shifting of gears and consequent reduction in speed during the period when acceleration is desired.

Another object of my invention is to provide a transmission system having low and second gear ratios of such values as to permit substantially synchronous speed operation of the induction units in both direct and gear drive.

Another object of my invention is to provide a power transmission system for automobiles and the like whereby the smooth transference of engine torque to the wheels over a variable speed range is ensured, the actual torque and speed conditions being governed automatically by the conditions of travel.

Another object of my invention is to provide a power transmission system having two parallel, independently operating, induction drive units between prime mover and driven shaft.

Still another object of my invention is to provide a dual induction drive apparatus wherein one unit of the apparatus is so positioned and arranged as to transmit its induced torque at reduced speed and correspondingly increased effective value.

My invention contemplates a power transmission system wherein power from a prime mover is transmitted to a driven shaft by means of a plurality of electro-magnetic induction units. One of these units is arranged to impart motion to the driven shaft directly, by reason of a non rigid electrical connection as disclosed in U. S. Patent No. 1,794,613 previously cited. In accordance with my invention a second induction unit is adapted to impart motion to the driven shaft through a speed reduction gear train, which is automatically cut in and out according to the relative speed of the induction units and driven shaft, and also in accordance with the torque required by the shaft in proportion to that relatively transmitted by the two units.

My construction obviates the rigid friction clutch of the patent cited and provides a starting and accelerating arrangement having great flexibility, this desirable characteristic being obtained by utilization of the comparatively high torque and high slip range between engine and shaft, ensuring smooth starting and also permitting the engine to run at a much more efficient power speed than is possible with existing arrangements including a friction clutch.

The novel features which I believe to be characteristic of my invention are set forth with particularity in the appended claims. My invention itself, however, both as to its organization and method of operation, together with further objects and advantages, will best be understood by reference to the following description taken in connection with the accompanying drawings, wherein:

Figure I is a longitudinal sectional view of one type of a dual electro-magnetic unit within my invention with certain other electrical units shown in elevation, together with prime mover and parallel driven shafts, all assembled in power transfer relation.

Figure II is a wiring diagram showing the several electrical connections required for the apparatus of my invention, but with the ignition and lighting arrangements commonly taken therefrom omitted, the omission being in the interest of simplicity; it being understood that the usual electrical equipment comprising lighting and charging generator, storage battery, starting motor, and general wiring for lights, ignition, etc. may be retained intact; the only additional unit added to the electrical system in common use being the small direct current generator designed for supplying excitation to the induction units as shown in Figure I.

Figures III, IV and V are torque speed curves representative of the induction units used and the application of these curves to operation of the system.

Referring now in detail to Figure I, 1 represents the engine, or prime mover; 2, an end frame having gear 3 so arranged as to co-operate with pinion 4 of self-starter 5. Generator 6 is coupled to engine 1 by a belt or chain 7, as in standard practice.

A cylindrical supporting frame, 8, is rigidly fixed to end structure 2 by bolts a. Secondary members 9 and 11 of the dual induction unit are rigidly fixed to supporting frame 8 by keys b and c. These members are preferably of laminated construction, as shown, and are each provided with slots near the inner circumference with electrical windings 13 and 14 mounted respectively therein. The resistance of the electrically secondary winding 13 is of such value as to confine the maximum torque developed between 13 and its inductively associated primary within a comparatively narrow slip speed range close to synchronism. The resistance of secondary winding 14 is preferably of somewhat higher resistance than secondary 13, whereby the effective torque developed between secondary winding 14 and its inductively associated primary is extended over an appreciably greater slip speed range. Windings 13 and 14 may be of squirrel cage, or other suitable construction.

The driven shaft is 15. It is concentrically mounted on end frame 2 by ball bearings d, and is further supported by bearings e on supporting frame 16.

The electrically primary member 10 of the first induction unit 9—10 carries an exciting coil 17, and is mounted rigidly upon driven shaft 15 by key f. Primary member 12 of the second induction unit 11—12 also carries a coil, 18, and may be similar in other respects to primary 10 except that instead of being mounted directly upon shaft 15 it is rigidly fastened by key g to sleeve 19. Sleeve 19 is free to revolve on shaft 15, and is restrained from longitudinal motion by some means, as by stop rings h and i.

Mounted on the outer end of supporting frame 8 is a plate or flange 20, concentrically and rigidly fastened thereto by bolts j, and supported on sleeve 19 by ball bearings k. Flange 20 is provided with a circular friction surface 21 arranged to engage with a friction disc 22 slidingly keyed on shaft 23 of exciter 24. Friction disc 22 is normally held in contact with friction surface 21 by a spring 25, and it may be manually released from contact through a pedal or other lever mechanism, not shown, operating in groove 26.

Electric current from exciter 24 may be led to primary coils 17 and 18 through slip rings 27 and 28, in which case slip ring 27 in electrical association with primary coil 17, is fixed directly on shaft 15, and slip ring 28 in electrical association with coil 18 is mounted upon sleeve 19. Suitable slots, not shown, may be provided in shaft 15 and in sleeve 19 for carrying the electrically conductive leads from slip rings 27—28 to coils 17—18.

Primary 12 of the second induction unit 11—12, is in electrical association with its secondary 11 and has no rigid conductive power transmitting connection therewith. As previously described, however, primary 12 is rigidly fixed to sleeve 19 and is adapted to impart motion thereto by reason of the torque developed through the action of the revolving electrical secondary 11. Also rigidly fixed to sleeve 19 is gear 29 continuously meshing with gear 30, which is fixed by key 1 to countershaft 31. Countershaft 31 in turn carries "low" gear 32, "second" gear 33 and "reverse" gear 34 arranged to drive, selectively, slipping clutch assembly 35, as explained in detail in Patent No. 1,752,937 issued to me April 1, 1930. The torque produced by members 11—12 of the induction units and transferred through sleeve 19 and gears 29—30 is transferred to the driven shaft 15 at reduced speed and with correspondingly increased torque through any of the countershaft reduction gears 32, 33, 34 and by means of the automatic meshing action of the one way clutch assembly 35.

This slipping clutch assembly 35 may be described briefly as follows: Slidingly mounted on shaft 15 is sleeve 51, revolvingly fixed thereto by key 52. Mounted on sleeve 51 and revolvingly free thereon is a member 53 consisting of a large gear 54, a smaller gear 55 and a jaw clutch member 56 arranged with teeth to drive only in one direction. 53 is kept from longitudinal motion along 51 by collar 57 or other means. Also mounted on sleeve 51 and slidingly keyed thereto by key 59 is another member 60 consisting of a jaw clutch member 61 and a large gear 62 and having on its outside periphery a circular groove 63 and one or more spiral grooves 64 having the same pitch as the back side of the teeth of jaw clutch member 61 and opening into the circular groove 63. Nut 65 is provided to limit longitudinal motion of the member 60 along the sleeve and may be provided with a circular groove 66 for engagement with suitable shifting means not shown for imparting longitudinal motion along the shaft to sleeve 51 and its supported members. 67 is a pin or tooth made in the form of a parallelogram having two sides parallel with sides of groove 63 and the other two sides parallel with sides of grooves 64 so as to be a good sliding fit in either of said grooves. 67 is rigidly fastened to arm 68 which in turn is rigidly fastened to 53 by screws 69 or other means. Some form of spring not shown is provided for imparting initial motion to 60 along the sleeve 51.

The member 60 on sleeve 51 has some tendency to move towards 53 because of the spring means provided for this purpose so that as the tooth 67 is carried around by the revolution of 53 it will engage in the spiral groove 64 and draw 60 towards 53 until the jaw clutch 56—61 is engaged. Shaft 15 is then driven through key 59, sleeve 51, and key 52 by the power transmitted from shaft 31 at a speed determined by the intermediate gear ratio.

If direct power is applied to the shaft 15 sufficient to drive the shaft at a higher speed than it is being driven, 60 will be driven at a higher speed than it was driven by the reduction gear, and the jaw clutch will force members 53 and 60 out of engagement and member 53 will continue to run free on sleeve 51 at the speed determined by the gear ratio while 60 continues to run at the speed of shaft 15 and is held out of engagement with 53 by tooth 67 revolving in circular groove 63 relatively backward with respect to spiral groove 64.

If the direct power driving shaft 15 should decrease and the slipping increased to such a point that the speed of the shaft 15 and therefore the sliding member 60 becomes equal to that at which revolving member 53 is driven by the gear reduction from shaft 31, the same relative conditions obtain as when shaft 15 was at a standstill and the same operation of meshing between members 53 and 60 takes place and shaft 31 drives shaft 15 as long as these conditions of speed and torque continue.

Induction unit 9—10 is the direct drive unit, member 10 being mounted directly on driven shaft 15, as previously described. The torque produced by the interaction of members 9 and 10 is always transferred directly to the driven shaft 15. Assuming a condition (as during starting) where the major part of the load is carried by the unit 11—12, as the speed of driven shaft 15 increases in proportion to engine speed, a point is reached at which member 12 is running at approximately synchronous, or engine speed. At this time the torque of the direct drive unit 9—10 has increased sufficiently to take the entire load. Since the unit 9—10 always transmits some torque to the shaft at any time the car is running forwardly, there is no time or torque lapse between driving by one unit alone (as in high speed,) or by both units in parallel, as in starting, accelerating, hill climbing or other "heavy going."

Figure II is a wiring diagram of the electrical circuits adapted for use with the dual induction drive unit of my invention and shows a reverse current relay 36, ammeter 37, battery 38, and starting motor switch 39 in electrical association with the starting motor 5 and generator 6 of Figure I. Like characters represent corresponding parts in both figures, thus: the first induction drive assembly comprises primary 10 exciting coil 17 and secondary 9; the second assembly comprises primary 12 exciting coil 18 and secondary 11. Direct current for coils 17 and 18 is provided by exciter 24. Additional features (not included in Figure I) are the normally self-exciting shunt field 40 for exciter 24, auxiliary starting field 41 shown connected through relay contacts 42—43 and safety switch 44 to battery 38. Relay coil 45 is adapted to open contacts 42—43 when exciter 24 becomes self-exciting. Switch 46 for unit 9—10 is operated by the manual gear shift lever and is closed only in forward driving position. Switch 47 for unit 11—12 and also safety switch 44 are likewise operated by the gear shift lever and are closed in all driving positions but are open when in neutral.

Another switch, 48, may be provided for emergency excitation of the induction units by battery 38, in which case it is normally in contact with 49 and is selectively arranged to make contact at 50 when necessary or desirable.

The normal sequence of operation is as follows: The engine is started in the usual manner. The exciter clutch is released and the manual transmission lever set in low, second, or reverse according to the starting requirements. For starting under normal conditions "second" gear is preferably selected, should it be necessary or desirable to utilize "low" gear the automatic changeover from gear to direct drive is directly from "low" to direct or high speed. For forward driving this operation also closes switches 44, 46 and 47 and for reverse driving switches 44 and 47 only. Engaging the exciter clutch causes rotation of the exciter armature and because of the auxiliary field from the battery, generation of current starts immediately, thus exciting the fields of the induction units and causing a torque reaction between their primary and secondary members similar to that which takes place in the ordinary alternating current electric motor on closing the line switch, the difference being that in accordance with my arrangement there is a mechanically revolving direct current field in contrast to the electrically revolving field of the usual motor.

The curves of Figure III are torque-speed curves of two induction motors having the same maximum torque but differently distributed over the speed range because of different secondary resistances, as in my preferred coil construction.

D1 represents the torque speed curve of the first induction unit (9—10 of Fig. 1) and D2 the corresponding curve of the second induction unit (11—12 of Fig. 1) each being drawn with respect to its own synchronous speed.

In Figure IV the same curves are shown with reference to the synchronous speed (referred to driven shaft) of the first unit, D2 taking the form of D3 in synchronism with the prime mover at point A of the first unit curve as determined by the ratio 0-100/0-A of "second" gear reduction.

In Figure V, D2 of Fig. III takes the form of D4 with the second unit in synchronism with the engine at B of the first unit curve D1, as determined by "low speed" gear reduction ratio 0-100/0-B.

As previously described, in forward driving some torque is simultaneously produced between the first and second members of the first unit and is transferred directly to the driven shaft. As the speed of the driven shaft increases in proportion to engine speed, a condition is reached at which the second member of the second unit is running at approximately synchronous or engine speed, and at this time the torque of the first unit has increased sufficiently to take a large percentage of the load.

If the torque of the first unit is not sufficient at this point to pick up the entire load, further increase in engine speed will cause still further increased excitation and consequent increased torque or a slight gradual reduction in engine speed will bring the engine more nearly into synchronism with the driven shaft and a greater torque will be transmitted by the first unit due to the better working condition of the higher point on the first clutch unit torque speed curve. Reference to Figures IV and V will show this lowered speed condition whereby the torque of the first unit will move up to the curve D1 due to the actual speed of the shaft increasing, or at any rate continuing constant, while the engine speed is dropped, thus reducing the ratio between these speeds or raising the percent of synchronous speed point. As the changeover from combined parallel drive to first unit drive occurs the slipping one way clutch releases so that there is no torque being transmitted by the second unit and this second member continues to run in approximate synchronism with the engine and continues to drive the countershaft and thereby the free running member of the one way clutch without carrying any load.

An increase in torque required on the driven shaft causes an increase in slip or relative difference in speeds between the two members of the first unit or between the engine and driven shaft and sufficient continuation of this condition causes the driven shaft speed to be reduced relative to engine speed to that at which the free member of the one way clutch is being driven by the second unit and gear reduction. A further torque requirement and consequent tendency to further drop in driven shaft speed causes the automatic engagement of the one way clutch and driving by the second unit supplying the needed additional torque.

On account of the direct torque always supplied, the work done by the second unit and gears is considerably less than in the corresponding conditions with the customary gear shifts so that noise and wear is greatly reduced. This contrasts with the ordinary gear shift drive in which there is always only a single driving relation between engine and driven shaft in action at one time and a change from one to the other necessitates a time and power lapse during the shifting as well as the manual effort and strain required.

On account of the comparatively long effective torque speed range of the induction units as compared with the fixed speed relation between engine and driven shaft of the customary gear drive an appreciably smaller gear ratio is necessary in both low and second gear reductions, this combination allows an increase in actual transmitted torque over corresponding driven shaft speed conditions with the ordinary system.

The condition of change from first unit direct drive plus second unit and gear drive to direct drive by first unit only, will take place when the manual transmission is started in either low or second, aided perhaps by practically unconscious manipulation of the engine speed by the operator as the car speed increases. After the car is running in direct drive the manual shift can be changed from low to second, if the car was started in low, without interfering with the car propulsion or other conditions as the gears are running without any load under these conditions.

In addition to the efficiency and convenience of the automatic operation some practical advantages of the system are: low voltage, comparatively low current, absence of commutators and brushes in the induction units and various other features of simplicity which make present electro-magnetic transmission systems troublesome. The armature windings are self-contained, preferably of the squirrel cage ordinary type with no external connection and practically indestructible and trouble proof. The field windings being supplied with low voltage have negligible insulation problems and only a single slip ring and brush are required for each field, which should cause minimum trouble.

The exciter, built on the same general design of the ordinary lighting generator, should require no attention other than occasional care of the brushes.

While the induction units have been shown and described as each having a separate primary and secondary member they might be constructed so that the part fastened to the engine fly wheel is common to both units. This may be the secondary, electrically speaking, or squirrel cage member as shown and described or may be the field or exciting member, in which case only one slip ring would be required and a single field winding. With a common field for both units, reverse driving would be obtained through a difference of torque. The first unit tendency to drive forwardly; the second unit driving in reverse at considerably increased torque due both to the gear reduction and to the higher relative torque output of the second unit over the first at low speed.

As a number of possible embodiments may be made of the above invention, and as changes might be made in the embodiment above set forth, without departing from the spirit and scope of the invention, it is to be understood that the foregoing is to be interpreted as illustrative and not in a limiting sense except as required by the prior art and by the appended claims.

What is claimed is:

1. A transmission comprising a prime mover, a driving shaft, a driven shaft, first electro-magnetic means for transmitting power directly between said shafts at all speeds of said prime mover, second electro-magnetic means for transmitting additional power indirectly between said shafts at a reduced speed ratio only, and means for automatically connecting and disconnecting said second means between said shafts without affecting transmission of power by said first mentioned means.

2. A transmission comprising a driving shaft, a driven shaft, an induction torque unit having electrically inductive elements permanently connected to said shafts for transmitting power directly therebetween, a second induction torque unit for transmitting additional power between said shafts at a reduced speed ratio only, and means for connecting and disconnecting said second unit into and out of parallel driving relation with said first unit.

3. A transmission comprising a driving shaft, a driven shaft, an induction torque unit having electrically inductive elements rigidly connected to said shafts for transmitting power directly therebetween, a second induction torque unit for transmitting additional power between said shafts at a selective reduced speed ratio only, and means for automatically connecting and disconnecting said second unit into and out of parallel driving relation with said first unit as determined by the relative torque requirement of said driven shaft and the torque directly transmitted by said first unit.

4. A transmission for automobiles and other variable speed devices comprising a prime mover, a driven shaft, electromagnetic means for transmitting power from said prime mover to said driven shaft at substantially synchronous speed, a reduced speed mechanism including low and second speed gears, second electro-magnetic means for transmitting additional power from said prime mover to said driven shaft through said reduced speed mechanism, means associated with said reduced speed mechanism for connecting and disconnecting said second electro-magnetic means into and out of parallel driving relation with said first electromagnetic means and manually operative means for interposing either said low speed gear or said second speed gear between said second electro-magnetic means and said driven shaft independent of the operating condition of said first electro-magnetic means.

5. A transmission system comprising a driving shaft, a driven shaft, an induction torque unit having a winding on one shaft and an inductively coupled winding on the other shaft for running the driven shaft in approximate synchronism with the driving shaft, a reduced speed mechanism, a second induction torque unit having a winding on said driving shaft and an inductively coupled winding on said reduced speed mechanism for transmitting power between said shafts at reduced speed and proportionately increased torque, means for connecting said second unit into parallel driving relation with said first unit and operable to disconnect said second unit when the speeds of said units differ by the selected gear ratio.

6. A transmission system comprising a driving shaft, a driven shaft, an electro-magnetic unit having a winding on one shaft and an inductively coupled winding on the other shaft, a reduced speed mechanism, a second electro-magnetic unit having a winding on said driving shaft and an inductively coupled winding on said reduced speed mechanism, means for energizing all of said windings and adapted to produce a torque between the windings of said first electro-magnetic unit and another torque between the windings of said second electro-magnetic unit proportional to the speed of said driving shaft.

7. A transmission system comprising a driving shaft, a driven shaft, an electro-magnetic unit having a winding on one shaft and an inductively coupled winding on the other shaft, the resistance of the electrically secondary winding of said unit being of such value as to confine the maximum torque developed between the windings of said unit within a comparatively narrow slip-speed range close to synchronism, a reduced speed mechanism, a second electromagnetic unit having a winding on said driving shaft and an inductively coupled winding on said reduced speed mechanism, the resistance of the electrically secondary winding of said second unit being of higher resistance than that of said first unit whereby the effective torque developed between the windings of said second unit is extended over an appreciably greater slip-speed range, means for energizing all of said windings and adapted to produce a torque between the windings of said first unit and another torque between the windings of said second unit proportional to the speed of said driving shaft.

8. A transmission comprising a driving shaft, a driven shaft, electro-magnetic means having secondary and primary elements connected respectively to said shafts for transmitting torque directly therebetween, a reduced speed mechanism including an overrunning clutch, and second electro-magnetic means comprising electrically primary and secondary elements individual thereto for transmitting torque to said driven shaft through said speed reduction mechanism, the total torque on said driven shaft when said clutch is engaged being usefully greater than that transmitted thereto by said second means through said speed reduction mechanism.

DAVID A. BARNETT.